United States Patent
Leinonen et al.

(10) Patent No.: US 8,170,063 B2
(45) Date of Patent: May 1, 2012

(54) METHOD FOR REDUCING INTERFERENCE

(75) Inventors: Marko Leinonen, Haukipudas (FI); Pertti Kangas, Oulu (FI); Seppo Rousu, Oulu (FI)

(73) Assignee: Nokia Corporation, Espoo (FI)

(*) Notice: Subject to any disclaimer, the term of this patent is extended or adjusted under 35 U.S.C. 154(b) by 1069 days.

(21) Appl. No.: 11/921,107

(22) PCT Filed: May 31, 2005

(86) PCT No.: PCT/FI2005/000246
§ 371 (c)(1),
(2), (4) Date: Mar. 3, 2008

(87) PCT Pub. No.: WO2006/128948
PCT Pub. Date: Dec. 7, 2006

(65) Prior Publication Data
US 2009/0252122 A1 Oct. 8, 2009

(51) Int. Cl.
*H04J 1/00* (2006.01)
(52) U.S. Cl. .................. 370/480; 455/444; 370/330
(58) Field of Classification Search .............. 370/330, 370/480; 455/444
See application file for complete search history.

(56) References Cited

U.S. PATENT DOCUMENTS

| | | | | |
|---|---|---|---|---|
| 5,303,289 | A * | 4/1994 | Quinn | 455/438 |
| 5,649,000 | A * | 7/1997 | Lee et al. | 455/436 |
| 7,031,662 | B2 * | 4/2006 | Suzuki et al. | 455/63.1 |
| 7,042,858 | B1 * | 5/2006 | Ma et al. | 370/331 |
| 7,657,262 | B2 * | 2/2010 | Grayson | 455/444 |
| 2002/0012381 | A1 | 1/2002 | Mattisson et al. | |
| 2003/0142647 | A1* | 7/2003 | Agrawal et al. | 370/331 |
| 2003/0228892 | A1 | 12/2003 | Maalismaa et al. | |
| 2004/0028003 | A1 | 2/2004 | Diener et al. | |
| 2004/0218562 | A1* | 11/2004 | Orava et al. | 370/329 |
| 2005/0096052 | A1* | 5/2005 | Csapo et al. | 455/439 |
| 2008/0125124 | A1* | 5/2008 | Craig | 455/436 |

* cited by examiner

*Primary Examiner* — Phuc Tran
(74) *Attorney, Agent, or Firm* — Squire Sanders (US) LLP

(57) ABSTRACT

This invention relates to wireless communication systems, specifically to methods for reducing interference. The invention allows a mobile station to determine if certain transmissions of the mobile station cause interference to reception by a second receiver in the mobile station, and indicate to the network that a change in a transmission parameter of the mobile station is desired. The network can then change a transmission parameter to reduce interference observed by the second receiver.

13 Claims, 2 Drawing Sheets

METHOD FOR REDUCING INTERFERENCE

FIELD OF INVENTION

This invention relates to wireless communication systems, specifically to methods for reducing interference.

TECHNOLOGICAL BACKGROUND

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of a communication system providing wireless communication is a public land mobile network (PLMN). An example of the fixed line system is a public switched telephone network (PSTN).

A cellular telecommunication system is a communications system that is based on the use of radio access entities and/or wireless service areas. The access entities are typically referred to as cells. Examples of cellular telecommunication standards includes standards such as GSM (Global System for Mobile communications), GPRS (General Packet Radio Servers), EDGE (Enhanced Data Rates for GSM Evolution), AMPS (American Mobile Phone System), DAMPS (Digital AMPS), WCDMA (Wideband Code Division Multiple Access), UMTS (Universal Mobile Telecommunication System) and CDMA 2000 (Code Division Multiple Access 2000). In addition to cellular telecommunication systems, other types of wireless communication systems are also known. For example, WLAN networks (wireless local area networks) are widely known. There are several WLAN standards in use, for example one for 2.4 GHz frequency (802.11b) and one for 5 GHz frequency area (802.11a). There is also a technology called WiMax which is typically classified to be an instance of wireless LAN technology. Radio communication technology using UWB (ultra wide band) techniques are presently being developed.

Combining different wireless technologies in a portable device such as a mobile phone or, more generally, a mobile station produces a number of problems. One difficult problem is interference of different wireless systems combined in the same device. For example, GSM transmissions can disturb WLAN connections, since harmonics of some GSM transmissions may in some cases fall within a WLAN frequency band. For example, the third harmonic of transmissions using the GSM1800 technology will fall at least partially on or near the 5 GHz WLAN frequency band. This is a significant problem, when a WLAN receiver and a GSM transmitter are in close proximity, for example integrated in the same device such as a mobile phone.

Harmonics are a problem for example in a device transmitting on a frequency band near 850 MHz, and having a Bluetooth receiver. Certain cellular technologies such as the GSM850, CDMA850, and WCDMA850 use a frequency band near or around 850 MHz. The third harmonic frequency of transmissions of such cellular transmitters fall at least partially on or near the Bluetooth reception frequency band.

Filtering can help remove the unwanted harmonics, but the filtering structures can be complicated and expensive. Also, filtering in high frequency such as in the 5 GHz WLAN frequency band, it is technically difficult to build high quality filters. This is due for example to self-resonance effects resulting from parasitic capacitances of inductors. Inductors can also be implemented using RF lines or micro lines on a substrate. However, the substrate material also causes loss of RF signal. The 5 GHz WLAN band is troublesome for filtering also because of its wide bandwidth of 675 MHz, which complicates filter design.

In some types of mobile terminals transmitted and received signals are separated by filtering in a so-called duplexer. Such a duplexer can reduce interference between a transmitter of one wireless system and a receiver of another wireless system. However, some systems such as a typical GSM/EDGE mobile station use a switch to connect the transmitter and the receiver to the antenna. In such a case, adding a filter to reduce interference of the transmitter to a second service would increase complexity and cost of the receiver. Receiver and transmitter insertion losses will also increase when extra filtering is added. This results in higher current consumption in transmitter and lower sensitivity in receiver.

Filtering is very difficult also in cases where a frequency band of a cellular communications network is very close to a frequency band of a second service. The bands may be so close that sufficiently good filters cannot be reliably or economically manufactured.

In addition to harmonics, another source of disturbances is wideband noise of a transmission, which can cause a significant increase in noise level experienced by a receiver in the same device as the transmitter. For example, wide band noise of GSM1800 transmissions outside of the transmission band may disturb GPS reception at GPS L1 band (1575.42 MHz) during the transmission slot. Also, wide band noise of a GSM900 transmitter can interfere with reception on the GPS L5 band (1176.25 MHz).

A mobile terminal may locate geographically itself with multiple methods. In a cellular network a straightforward way to locate the terminal is to use the cell identification information, which indicates the identity of the current base station. A network can also locate a terminal by observing the arrival times of the transmissions from multiple base stations. A growing trend for producing location information is integration of a satellite based locator device such as a GPS or Galileo receiver in a mobile station. However, transmissions to a wireless network from a mobile station can appear as interference to a GPS receiver in the mobile station.

There may be also devices, which have shared functionalities in different physical units. Such devices are often called multipart products. The first unit of the multipart product may comprise an earpiece and a microphone, while a second unit of the multipart product communicates with the cellular networks. Units of a multipart product can communicate between each other e.g. via Bluetooth air-interface.

Some radio communications whose reception in a mobile station can suffer due to transmissions of a cellular part in the mobile station are for example digital video broadcasts (DVB), WLAN transmissions, UWB transmissions, and bluetooth transmissions. The degree to which different services may be interfered by cellular transmissions depend naturally on location of frequency bands of these services, which varies from country to country, and even between operators in a given country. For example in US one cellular band can be shared between two operators.

Terrestrial digital video broadcasting (DVB-T) was first adopted as a standard in 1997, and has been deployed throughout many areas of the world. DVB-T offers about 24 megabits per second (Mb/s) data transfer capability to a fixed receiver, and about 12 Mb/s to receivers in mobile stations.

Mobile stations including such mobile receivers have already been produced and are able to receive the DVB-T signals.

While DVB-T allows high quality video broadcasting to be delivered to various devices, the DVB-T standard has certain problems with respect to mobile stations. One such problem is power usage, as mobile stations that implement DVB-T tend to consume too much power. Since mobile stations are battery powered unless plugged into a secondary power source, power usage is a critical design element. In response to this power usage and other effects of DVB-T, the DVB-H (a version of DVB for handheld devices) standard was created. DVB-H. Offers, among other things, reduced power usage as compared to DVB-T.

Because of the benefits of DVB-H over DVB-T, DVB-H is beginning to make inroads into the mobile station market. At the time of writing of this patent application, pilot projects using DVB-H technology to bring television like services to mobile devices have been started. While DVB-H is an improvement over DVB-T, DVB-H also causes certain problems. For instance, a mobile station typically will contain at least one transmitter that transmits using one or more frequency bands. The DVB-H receiver typically receives in a frequency band that is different than the one or more frequency bands used by any transmitter in the mobile station. For instance, certain mobile stations can support the global system for mobile communications (GSM) standard, and the frequency bands used by a GSM transmitter are different that the frequency band used by a DVB-H receiver. Nonetheless, transmitting using one frequency band can still cause interference in the frequency band used by the DVB-H receiver in the same device.

In the European Union DVB-H version, the reception band is on the lower side of the GSM frequency band (GSM900, which has a transmission frequency band of 880-915 MHz) and the reception frequency band is far enough that transmissions on the 900 MHz frequency band are not band-blocking the DVB-H receiver. Nonetheless, the wide band noise may be a problem also in European DVB-H reception.

In terms of the U.S. standards, transmissions on the 850 MHz frequency band may generate a second harmonic, which will be at least partially on top of the U.S. DVB-H reception frequency band of 1670-1675 MHz. Also, the 850 MHz frequency band transmission will generate wide band noise to the U.S. DVB-H frequency band. The most difficult frequencies are 835.0-837.5 MHz in transmission, since these frequencies generate harmonics directly on top of the U.S. DVB-H frequency band.

There will shortly be also other than DVB-H based digital TV services available in US. One known system in development is known as MediaFlo, which is a digital TV service driven by Qualcomm Inc. The centre frequency of transmission in the MediaFlo system is 719 MHz. This digital TV system will use OFDM based modulation method, which is similar than used in DVB-H system. Thus similar interoperability problems can be assumed with MediaFlo system than with DVB-H system. The wideband noise from 850 MHz band cellular system may generate interfering noise to the MediaFlo reception channel.

SUMMARY OF THE INVENTION

Embodiments of the present invention aim to overcome one or several of the above problems.

According to one aspect of the invention, a method for mobile station of a wireless communication network is provided. The method can be used in a mobile station having a first receiver and a first transmitter for communicating with the wireless communication network on at least a first frequency band, and a second receiver for receiving transmissions on at least a second frequency band. The method comprises the steps of determining if changing of a transmission parameter of the mobile station would cause less interference to reception by the second receiver by transmissions of the mobile station, and if it is so determined, transmitting a message to the wireless communication network indicating a communication parameter.

The message can indicate a channel, a frequency band, a second wireless communication network, a modulation method, timing information, or for example a type of service received by the second receiver or location information of the mobile terminal. The message can also indicate timing information of a second wireless communication network, or for example timing information of a signal interfering reception by the second receiver. The message can also indicate a power level of an interfering signal, a transmission power level of a second wireless communication network, a reception power level of a signal received from a second wireless communication network, or for example a frequency of an interfering signal.

The message can be a handover request message.

The method can further comprise the step of transmitting an indication of more than one transmission channel, frequency band, or wireless communication network, and an indication of order of preference of the more than one transmission channel, frequency band, or wireless communication network.

The method can further comprise the step of transmitting an indication to the wireless communication network that reception by the second receiver has ended.

In an embodiment, the message can indicate a transmission parameter to be used in transmissions from the mobile station to the wireless communication network.

In a further embodiment, the message can indicate a transmission parameter to be avoided in transmissions from the mobile station to the wireless communication network.

According to a second aspect of the invention, a method in a wireless communication system is provided. The method comprises the steps of receiving a message from a mobile station, extracting indication of a communication parameter from the received message, and changing a communication parameter of the radio link between the wireless communication system and the mobile station as a response to receiving the message.

The method can comprise the steps of receiving an indication from a mobile station that reception by a second receiver in the mobile station has finished, and initiating a handover as a response to receiving the indication.

The method can comprise the steps of receiving information from the mobile station about timing of reception by a second receiver in the mobile station, and adjusting a communication parameter on the basis of the received timing information.

The method can comprise the steps of receiving information from the mobile station about a frequency band received by a second receiver in the mobile station, selecting a handover target at least in part on the basis of the received information about the frequency band, and initiating a handover to the selected handover target.

The method can comprise the steps of receiving information from the mobile station about a type of service received by a second receiver in the mobile station, selecting a handover target at least in part on the basis of the received information about a type of service, and initiating a handover to the selected handover target.

The handover target is a channel, a frequency band, or for example a wireless communication network.

According to a third aspect of the invention, a mobile station having a first transmitter and a first receiver for communicating with a wireless communication network on at least a first frequency band and a second receiver for receiving transmissions on at least a second frequency band is provided. The mobile station comprises
- a controller for determining if changing of a transmission parameter of the mobile station would cause less interference to reception by the second receiver by transmissions of the mobile station, and
- a transmitter for transmitting, as a response to a positive determination by the controller, a message to the wireless communication network indicating a communication parameter.

The mobile station can comprise a controller for transmitting information to the wireless communication network about timing of reception by the second receiver.

The mobile station can comprise a controller for transmitting information to the wireless communication network about a second frequency band.

The mobile station can comprise a controller for transmitting information to the wireless communication network about the type of service received by the second receiver.

The mobile station can comprise a controller for transmitting an indication of more than one transmission channel, frequency band, or wireless communication network, and an indication of order of preference of the more than one transmission channel, frequency band, or wireless communication network.

The mobile station can comprise a controller for transmitting, as a response to ending of reception by the second receiver, an indication to the wireless communication network that reception by the second receiver has ended.

According to a fourth aspect of the invention, a network element for a wireless communication system is provided. The network element comprises a
- a controller for extracting an indication of a communication parameter from a message received from a mobile station, and
- a controller for changing a transmission parameter of the radio link between the wireless communication system and the mobile station as a response to extracting a communication parameter from a message received from a mobile station.

According to a fifth aspect of the invention, a system in a wireless communication network is provided. The system comprises
- a controller for extracting an indication of a communication parameter from a message received from a mobile station, and
- a controller for changing a transmission parameter of the radio link between the wireless communication system and the mobile station as a response to extracting a communication parameter from a message received from a mobile station.

According to a sixth aspect of the invention, a software program product for carrying out the steps of the method for a mobile station is provided. The software program product can be executed in a processing unit of a mobile station for carrying out the specified method steps. The software program product can be provided in different types of media, such as in a memory means such as random access memory, rewritable memory such as FLASH memory, or read only memory. The software program product can also be provided on a magnetic, magneto-optical, or optical carrier such as a CD-ROM.

According to a seventh aspect of the invention, a software program product for carrying out the steps of the method in a wireless communication system is provided. The software program product can be executed in a processing unit of a network element of the wireless communication system for carrying out the specified method steps. The software program product can be provided in different types of media, such as in a memory means such as random access memory, rewritable memory such as FLASH memory, or read only memory. The software program product can also be provided on a magnetic, magneto-optical, or optical carrier such as a CD-ROM.

The invention can also be provided as an integrated circuit, for example as a circuit having a processor unit and a memory means, or for example as a dedicated ASIC circuit. According to an eighth aspect of the invention, an integrated circuit for a mobile station of a wireless communication network is provided, the mobile station having a first transmitter, a first receiver, and at least a second receiver. The integrated circuit comprises a controller for determining if changing of a transmission parameter of the mobile station would cause less interference to reception by the second receiver by transmissions of the mobile station, and a message transmitter for initiating, as a response to a positive determination by the controller, transmission of a message to the wireless communication network indicating a communication parameter.

The integrated circuit can further comprise an information structure containing information about at least one transmission parameter for the first transmitter causing interference to reception on a channel or a frequency band by the second receiver.

The integrated circuit can further comprise a calculator for calculating harmonic frequencies of transmissions of the first transmitter, and a controller for determining whether a harmonic frequency of a transmission by the first transmitter falls within a reception channel or a frequency band of the second receiver.

BRIEF DESCRIPTION OF THE DRAWINGS

Embodiments of the present invention will now be described by way of example with reference to the accompanying drawings, in which.

DETAILED DESCRIPTION OF EMBODIMENTS

Figure 1:
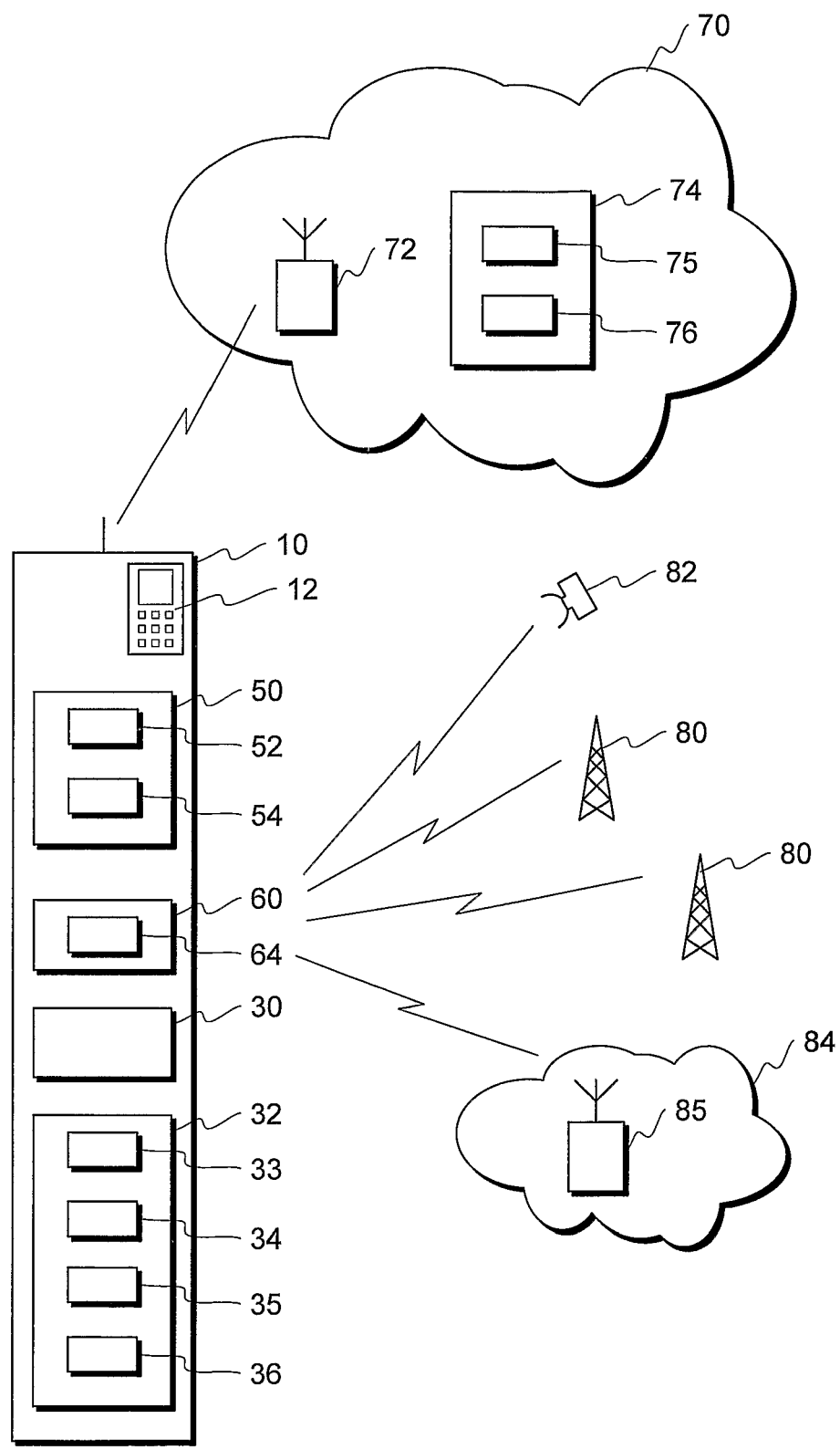
FIG. 1 illustrates a mobile station with a first wireless part and a second wireless part and a network element.

FIG. 1 illustrates a mobile station 10 comprising a first wireless part 50 with a first transmitter 52 and a first receiver 54, and a second wireless part 60 with at least a second receiver 64. The mobile station has also an user interface 12 comprising for example a display and a keyboard. The mobile station also comprises at least one processor 30 for controlling the operations of the mobile station and performing many of the functions of the mobile station. A mobile station typically comprises many other components as well, but for clarity, other components are not illustrated in FIG. 1.

FIG. 1 also illustrates a wireless communication network 70 having a base station 72, with which the mobile station 10 communicates. The wireless communication network can be for example a cellular communication network such as a GSM, UMTS, or a CDMA network, or a WLAN network.

FIG. 1 also illustrates several other types of wireless services that the second wireless part 60 of the mobile station can utilize. For example, the second wireless part can be a satellite location receiver such as a GPS receiver receiving location signals from a satellite 82. The second wireless part 60 can also be a television receiver, such as a DVB-H receiver, for receiving transmissions from television broadcast transmitters 80. The second wireless part can also comprise a receiver 64 and a transmitter for a second wireless communication system on a different frequency band or bands than the first wireless part 50. For example, the second wireless part can be a WLAN transceiver in a mobile station having a GSM transceiver as the first wireless part, the second wireless part communicating with a base station 85 of a WLAN network 84.

FIG. 1 also illustrates a network element 74 of the wireless communication network. The network element 74 comprises means 75 for extracting an indication of a communication parameter from a message received from a mobile station, and means 76 for changing a transmission parameter of the radio link between the wireless communication system and the mobile station as a response to extracting a communication parameter from a message received from a mobile station. These means can be realized in the form of controllers, or for example as software code executed in a processor of the network element.

In an embodiment of the invention, the inventive method is implemented in an integrated circuit 32. In the example of FIG. 1, the integrated circuit comprises a controller 33. The controller can determine whether changing of a transmission parameter of the mobile station would cause less interference to reception by the second receiver by transmissions of the mobile station. The integrated circuit also comprises a message transmitter 34 for initiating transmission of a message to the wireless communication network indicating a communication parameter.

In the example of FIG. 1, the integrated circuit also comprises an information structure 35 containing information about at least one transmission parameter for the first transmitter causing interference to reception on a channel or a frequency band by the second receiver. For example, the information structure can indicate that GSM transmissions in certain channels cause interference to reception in certain WLAN channels. In the example of FIG. 1, the integrated circuit also comprises a calculator 36 for calculating harmonic frequencies of transmissions of the first transmitter, and a controller 33 for determining whether a harmonic frequency of a transmission by the first transmitter falls within a reception channel or a frequency band of the second receiver.

The invention is based on the insight that a mobile station which has a first transmitter and a first receiver for communicating with a wireless network and a second receiver for receiving transmissions from another service has information about the frequency band (or bands) of the second receiver. If the mobile station observes that a channel on which the mobile station transmits or is going to transmit causes interference to reception of service by the second receiver, the mobile station can send an indication about this to the wireless communication network. The indication can be for example in the form of a message indicating a channel which would cause less interference. Upon receiving such an indication, the network can change the transmission channel used for communication between the mobile station and the network for example by initiating a handover to a different channel, to a different cell, or for example to a different frequency band. The network can also initiate a handover to a different wireless communication network if the mobile station is able to communicate in two different networks, such as in a GSM and a CDMA network.

The communication between the mobile station and the network can also change the modulation method in order to reduce interference. For example, in a GPRS/EDGE system the communication can change between EDGE modulation which is used for higher bitrate communications and GMSK modulation which is used for lower bitrate communications.

The method can further comprise the step of changing the operating method of the transmission. This can be done for example in WCDMA/GSM network where WCDMA operation is used for higher bitrate communications and GSM operation is used for lower bitrate communications.

The mobile station can advantageously indicate also more than one channel, frequency band, or wireless communication network. The mobile station may also specify an order of preference, which the wireless communication network can take into account in decision about initiating a handover.

The mobile station can advantageously send a message indicating a more suitable transmission channel in a variety of situations. For example, the mobile station can send such a message upon observing that the second receiver is active during transmissions by the first transmitter of the mobile station. As another example, the mobile station can send such a message upon receiving a command from the user of the station to start reception using the second receiver.

In an embodiment, the system sends a message to the mobile station before a handover procedure indicating the candidate handover target. In such an embodiment, the mobile station can determine whether transmissions after the handover would generate more interference than transmissions before the handover. If the handover would cause an increase in interference, the mobile station can then send a message to the network indicating a transmission parameter such as another handover target.

The mobile station can determine which channels or frequency bands tend to cause interference to reception by the second receiver in a variety of ways. For example, the mobile station can comprise a table or another information structure containing information about conflicts between different transmission channels and/or transmission frequency bands and different reception channels and/or frequency bands. For example, the table can indicate that GSM transmissions in certain channels cause interference to reception in certain WLAN channels.

In an embodiment a mobile station can calculate interfering mixing products and/or harmonics internally when it knows operating frequencies of the radio interfaces of the first and second wireless parts. Based on those calculations and knowledge of the operation frequencies a terminal may find suitable radio frequencies for proposing to the network communicating with the first wireless part.

In an embodiment a mobile station can measure interference situations directly. For example, interference measurements can be done in a GSM/WLAN/Bluetooth system between transmission and reception slots, during periods when terminal would otherwise be in idle mode. The interference measurement results can be reported to the different radio networks.

The mobile station can also indicate timing information related to the reception of signals by the second receiver in a message to the wireless network. The wireless network can use this information to adjust one or more communication parameters, such as timing of communication between the mobile station and the network so as to reduce the simultaneous occurrence of transmission by the first transmitter in the mobile station and reception by the second receiver.

The mobile station can also indicate other kinds of information related to reception by the second receiver. Such information can be for example information about the frequency band or bands on which the receiver will operate, or for example type of service received by the receiver. The wireless network can use this information in determination of whether or not and to which channel or frequency band to perform a handover.

Such other kinds of information that a mobile station can indicate to the network are for example timing information of transmission and reception periods, which may help avoid interference if transmission and reception periods can be arranged so as to at least reduce interference.

In an embodiment, the mobile station can indicate the timing information in the form of channel and timing tables of a wireless part in the mobile station. The mobile station can for example send to the network the channel allocation table of a Bluetooth device in the mobile station.

The mobile station can also indicate to the network that another modulation method could also be used. This is an advantageous approach, if the interference can be reduced by changing the modulation method.

The mobile station can also indicate to the network the location of the mobile terminal. The location information can aid in determination of a more advantageous radio link for example to a nearer base station, which would allow reduction of transmission power of the first wireless part, and consequently reduce interference observed by the second wireless part. The mobile station can obtain the location information for example from the second wireless part, if the second wireless part is a location system receiver such as a GPS receiver.

Another way of using the location information to reduce interference is that as a result of reporting by the mobile stations the network will continuously have up-dated information about the interference situation. This information can be used for spectrum usage optimisation and data throughput optimisation by avoiding the use of interfered radio channels for the data transmission, thus reducing the need for re-transmissions of data. This will achieve a better user experience for the end user better and for the operator more delivered data bits, which can be charged from the user.

The mobile station can also comprise a second transmitter for communicating with the network providing the transmissions received by the second receiver. For example, a mobile station can comprise a transmitter and a receiver for communicating with a GSM network and a transmitter and a receiver for communicating with a WLAN network. In such an example, the mobile station can observe if simultaneous use of both the GSM network and the WLAN network occurs, and whether transmission to one of the networks disturbs reception from the other; and send a message to one of the networks to request a change of a transmission channel.

In an embodiment, the mobile station can send an indication to the network after the second transmitter is no longer used, in order to indicate that the original transmission channel can again be used.

Figure 2:
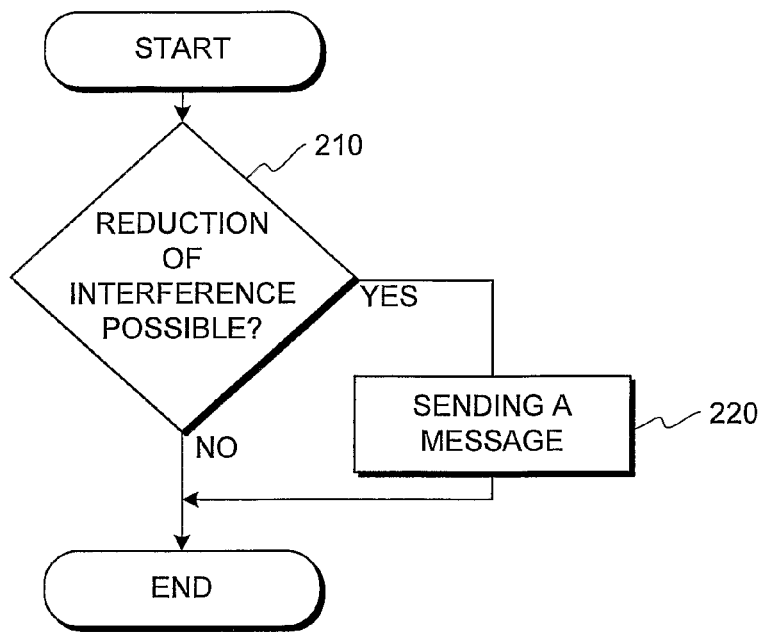
FIG. 2 illustrates a method in a mobile station.

FIG. 2 illustrates a method in a mobile station of a wireless communication system. The method comprises the steps of determining 210 if changing of a transmission parameter of the mobile station would cause less interference to reception by the second receiver by transmissions of the mobile station. If the determination is positive, a message is transmitted in step 220 to the wireless communication network indicating a communication parameter.

Figure 3:
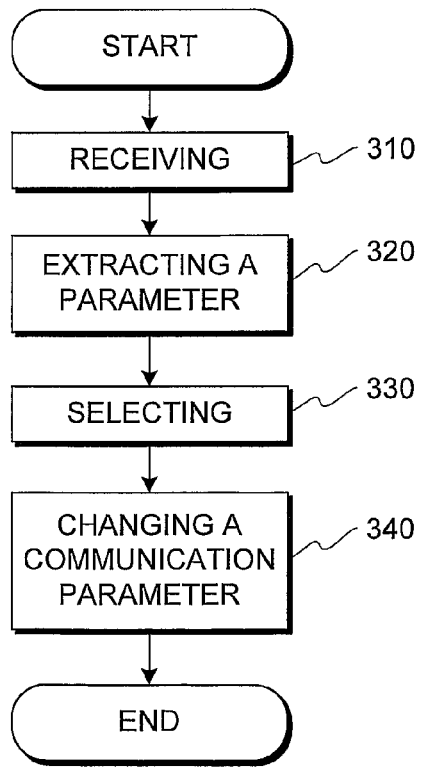
FIG. 3 illustrates a method in a network element of a wireless communication system.

FIG. 3 illustrates a method in a network element of a wireless communication system. The method comprises the steps of receiving 310 a message from a mobile station, extracting 320 a communication parameter from the received message, selecting 330 a communication parameter for the radio link between the mobile station and the wireless communication system, and changing 340 a communication parameter of the radio link between the wireless communication system and the mobile station as a response to receiving the message.

The step of selection can comprise for example selection of a handover target, and the step of changing a communication parameter can comprise a handover to the selected handover target.

The indication of a communication parameter resulting in reduced interference to the second wireless part can be performed in many different ways. The mobile station can indicate to the network a parameter or a plurality of parameters, which would be a better choice or choices than a currently used parameter. For example, the mobile station can indicate a plurality of channels for transmissions, the use of which would cause less interference than the use of a current transmission channel.

In a further embodiment, the mobile station can indicate to the network a parameter or a plurality of parameters, which should be avoided. For example, if transmissions on a current transmission channel interfere with the reception by the second wireless part in the mobile station, the mobile station can indicate the current transmission channel to the network, which in this embodiment would be a factor for the network to consider in changing the transmission to another channel.

In a further embodiment, the mobile station can indicate to the network a communication parameter or a plurality of parameters related to reception by the second wireless part. The network can then use the received parameters to determine suitable transmission parameters for the first wireless part of the mobile station. For example, the mobile station can indicate to the network the reception frequencies of the second receiver, and the network can then use this information to determine which transmission parameters would be suitable for the first wireless part in order to reduce possible interference observed by the second wireless part.

It is noted that while the preceding description illustrates various embodiments of the invention within a 3G cellular telecommunications system, the invention is not limited to a so called 3G cellular system, but can be implemented in different types of cellular telecommunication systems as well.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   transmitting, by an apparatus, a message to a wireless communication network on a first frequency band;
   receiving, by the apparatus, a transmission from a second wireless communication network on a second frequency band;
   calculating a harmonic frequency of the transmitted message on the first frequency band;
   determining whether the harmonic frequency causes interference to the reception of the transmission on the second frequency band;

determining if changing a transmission parameter of the apparatus on the first frequency band reduces the interference to the reception of the transmission on the second frequency band; and if it is so determined, transmitting an indicator to the wireless communication network indicating a proposal for a communication parameter, wherein the transmitting the indicator comprises indicating timing information of the second wireless communication network.

2. A method according to claim 1, wherein the receiving comprises receiving a broadcast transmission from a broadcast transmitter.

3. A method according to claim 1, wherein the transmitting comprises transmitting location information of the apparatus to the wireless communication network.

4. The method of claim 1, wherein the second wireless communication network comprises at least one of the following: a global positioning system or a television broadcast system.

5. A method, comprising:
transmitting, by an apparatus, a message to a wireless communication network on a first frequency band;
receiving, by the apparatus, a transmission from a second wireless communication network on a second frequency band;
calculating a harmonic frequency of the transmitted message on the first frequency band;
determining whether the harmonic frequency causes interference to the reception of the transmission on the second frequency band;
determining if changing a transmission parameter of the apparatus on the first frequency band reduces the interference to the reception of the transmission on the second frequency band, and
if it is so determined, transmitting an indicator to the wireless communication network indicating a proposal for a communication parameter,
wherein the transmitting the indicator comprises indicating timing information of a signal interfering reception by the apparatus.

6. A method according to claim 5, wherein the receiving comprises receiving a broadcast transmission from a broadcast transmitter.

7. A method according to claim 5, wherein the transmitting comprises transmitting location information of the apparatus to the wireless communication network.

8. A method, comprising:
receiving, by an apparatus, a message from a mobile node on a first frequency band;
extracting, by the apparatus, an indication of a communication parameter from the message;
changing, by the apparatus, the communication parameter of a radio link between the apparatus and the mobile node based on the indication in the message, wherein the indication indicates a determination that a harmonic frequency of a transmitted message to the apparatus from the mobile node produces an interference to a reception of a transmission by the mobile node over a second frequency band, and wherein changing the communication parameter reduces the interference;
receiving information from the mobile node about a timing of reception by the mobile node; and
adjusting the communication parameter based on the received timing information.

9. An apparatus, comprising:
at least one processor; and
at least one memory including computer program code,
wherein the at least one memory and the computer program code are configured to, with the at least one processor, cause the apparatus at least to:
transmit a message to a wireless communication network on a first frequency band,
receive a transmission from a second wireless communication network on a second frequency band,
calculate a harmonic frequency of the transmitted message on the first frequency band,
determine whether the harmonic frequency causes interference to the reception of the transmission on the second frequency band, and
determine if changing a transmission parameter of the apparatus on the first frequency band reduces the interference to the reception of the transmission on the second frequency band,
wherein, if it is so determined that changing the transmission parameter reduces the interference, transmit an indicator to the wireless communication network indicating a proposal for a communication parameter, and
wherein the memory and the computer program code are further configured to, with the processor, cause the apparatus at least to transmit information to the wireless communication network about a timing of reception by the apparatus.

10. An apparatus according to claim 9, wherein the memory and the computer program code are further configured to, with the processor, cause the apparatus at least to receive a broadcast transmission from a broadcast transmitter.

11. An apparatus according to claim 9, wherein the memory and the computer program code are further configured to, with the processor, cause the apparatus at least to transmit location information of the apparatus to the wireless communication network.

12. An apparatus, comprising:
at least one processor; and
at least one memory including computer program code,
wherein the at least one memory and the computer program code are configured to, with the at least one processor, cause the apparatus at least to:
transmit a message to a wireless communication network on a first frequency band;
receive a transmission from a second wireless communication network on a second frequency band;
calculate a harmonic frequency of the transmitted message on the first frequency band;
determine whether the harmonic frequency causes interference to the reception of the transmission on the second frequency band;
determine if changing a transmission parameter of the apparatus on the first frequency band reduces the interference to the reception of the transmission on the second frequency band, and
if it is so determined, transmit an indicator to the wireless communication network indicating a proposal for a communication parameter,
wherein transmitting the indicator comprises indicating timing information of a signal interfering reception by the apparatus.

13. An apparatus, comprising:
at least one processor; and
at least one memory including computer program code, wherein the at least one memory and the computer program code are configured to, with the at least one processor, cause the apparatus at least to:

receive a message from a mobile node on a first frequency band;

extract an indication of a communication parameter from the message;

change the communication parameter of a radio link between the apparatus and the mobile node based on the indication in the message, wherein the indication indicates a determination that a harmonic frequency of a transmitted message to the apparatus from the mobile node produces an interference to a reception of a transmission by the mobile node over a second frequency band, and wherein changing the communication parameter reduces the interference;

receive information from the mobile node about a timing of reception by the mobile node; and adjust the communication parameter based on the received timing information.

* * * * *